(12) United States Patent
Kim et al.

(10) Patent No.: US 11,516,194 B2
(45) Date of Patent: Nov. 29, 2022

(54) APPARATUS AND METHOD FOR IN-VEHICLE NETWORK COMMUNICATION

(71) Applicant: Electronics and Telecommunications Research Institute, Daejeon (KR)

(72) Inventors: Dae-Won Kim, Daejeon (KR); Dong-Wook Kang, Daejeon (KR); Sang-Woo Lee, Daejeon (KR); Jin-Yong Lee, Daejeon (KR); Boo-Sun Jeon, Daejeon (KR); Bo-Heung Chung, Daejeon (KR); Hong-Il Ju, Daejeon (KR); Byeong-Cheol Choi, Daejeon (KR); Joong-Yong Choi, Sejong-si (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 145 days.

(21) Appl. No.: 16/945,120

(22) Filed: Jul. 31, 2020

(65) Prior Publication Data

US 2021/0136051 A1 May 6, 2021

(30) Foreign Application Priority Data

Nov. 6, 2019 (KR) .......................... 10-2019-0141046

(51) Int. Cl.
*H04L 9/32* (2006.01)
*H04L 9/40* (2022.01)
(Continued)

(52) U.S. Cl.
CPC ............. *H04L 63/061* (2013.01); *H04B 3/56* (2013.01); *H04L 63/0428* (2013.01);
(Continued)

(58) Field of Classification Search
CPC ... H04W 12/041; H04W 12/06; H04W 12/08; H04W 12/108; H04W 12/04;
(Continued)

(56) References Cited

U.S. PATENT DOCUMENTS 8,806,242 B2 * 8/2014 Yousefi .................... H04W 4/46
713/320
9,021,246 B2 * 4/2015 Baltes .................... H04L 9/0891
713/176

(Continued)

FOREIGN PATENT DOCUMENTS

| KR | 101554634 B1 | 9/2015 |
| KR | 101781134 B1 | 9/2017 |
| KR | 1020180045900 A | 5/2018 |

*Primary Examiner* — Amare F Tabor
(74) *Attorney, Agent, or Firm* — William Park & Associates Ltd.

(57) ABSTRACT

Disclosed herein are an in-vehicle network apparatus and method. The in-vehicle network apparatus includes one or more processors and executable memory for storing at least one program executed by the one or more processors. The at least one program is configured to verify the integrity of software stored in advance in the executable memory, to generate a key table by sharing authentication information with a communication target, and to exchange an encrypted message with the communication target using the key table.

10 Claims, 4 Drawing Sheets

(51) Int. Cl.
    *H04W 4/48*         (2018.01)
    *H04B 3/56*         (2006.01)
    *H04W 12/06*        (2021.01)

(52) U.S. Cl.
    CPC ............. *H04W 4/48* (2018.02); *H04W 12/06* (2013.01); *H04L 2209/84* (2013.01)

(58) Field of Classification Search
    CPC ... H04W 12/0471; H04W 12/03; H04W 4/48; H04B 3/56; H04L 63/061; H04L 63/028; H04L 2209/84
    USPC .......................................................... 713/171
    See application file for complete search history.

(56) References Cited

U.S. PATENT DOCUMENTS

| | | | |
|---|---|---|---|
| 9,596,225 | B2 | 3/2017 | Kim et al. |
| 9,866,570 | B2 * | 1/2018 | Ichihara .............. H04W 12/121 |
| 10,009,325 | B1 * | 6/2018 | David ................. H04W 12/041 |
| 10,348,694 | B2 * | 7/2019 | Cho .................... H04W 12/062 |
| 10,530,572 | B2 * | 1/2020 | Ujiie .................. B60R 16/0231 |
| 10,630,651 | B2 * | 4/2020 | Chin ....................... H04W 12/06 |
| 10,812,261 | B2 * | 10/2020 | Usui ..................... H04W 80/02 |
| 10,911,949 | B2 * | 2/2021 | Nölscher ............... H04L 9/3297 |
| 10,965,757 | B2 * | 3/2021 | McCann ........... H04W 52/0203 |
| 11,212,080 | B2 * | 12/2021 | Takemori .................. H04L 9/32 |
| 2016/0014105 | A1 | 1/2016 | Kim et al. |
| 2016/0295001 | A1 | 10/2016 | Yun et al. |
| 2019/0028448 | A1 | 1/2019 | Farrell |
| 2019/0075454 | A1 * | 3/2019 | Nowottnick ............. H04B 1/40 |
| 2019/0364424 | A1 * | 11/2019 | Vanderveen ............ H04W 4/06 |
| 2020/0029209 | A1 * | 1/2020 | Nölscher ............. H04W 12/069 |
| 2020/0274892 | A1 * | 8/2020 | Kim .................... H04L 63/1425 |

\* cited by examiner

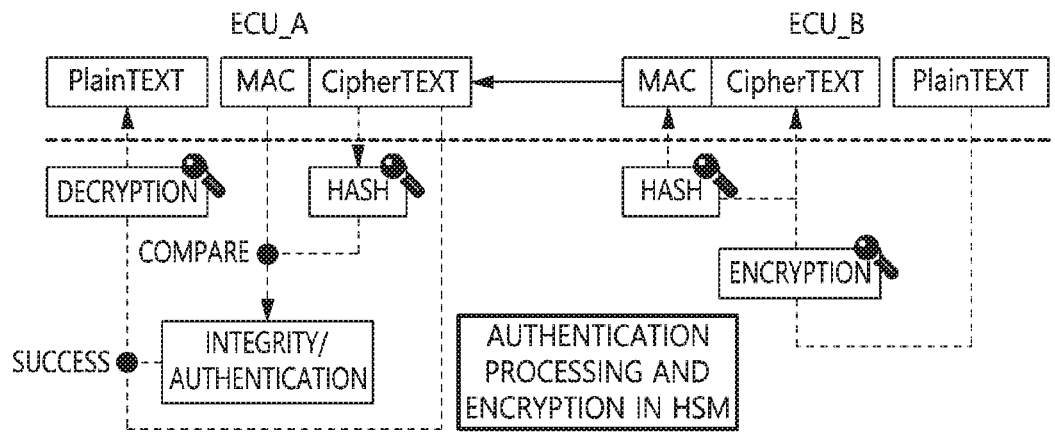
FIG. 3
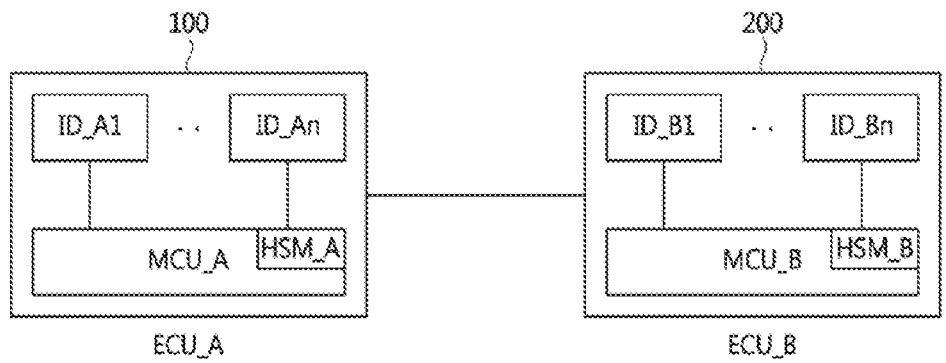
FIG. 4
| HSM_A | | | |
|---|---|---|---|
| LID | RID | ShrK | SesK |
| $I_A$ | $I_B$ | $K_{SHR1}$ | |
| HSM_B | | | |
|---|---|---|---|
| LID | RID | ShrK | SesK |
| $I_B$ | $I_A$ | $K_{SHR1}$ | |
FIG. 5

APPARATUS AND METHOD FOR IN-VEHICLE NETWORK COMMUNICATION

CROSS REFERENCE TO RELATED APPLICATION

This application claims the benefit of Korean Patent Application No. 10-2019-0141046, filed Nov. 6, 2019, which is hereby incorporated by reference in its entirety into this application.

BACKGROUND OF THE INVENTION

1. Technical Field

The present invention relates generally to vehicle security technology, and more particularly to In-Vehicle Network (IVN) communication security technology.

2. Description of the Related Art

Vehicles are becoming increasingly intelligent through the addition of autonomous driving and connectivity functions thereto. However, this means that the number of paths through which attackers can break into vehicles also increases.

The vehicle industry is very sensitive to security, and security vulnerabilities are directly connected to safety issues. Therefore, vehicle security is a problem that cannot be ignored in this field.

With respect to vehicle security, there is an In-Vehicle Network (IVN) communication security field. It is difficult to improve the robustness of communication security merely by encrypting messages. In order to realize ideal communication security, technologies for authenticating a communication target, protecting communication messages, and managing encryption keys are required. Particularly, key management is core technology, and the security level may be improved through hardware-based key management and encryption.

Research for in-vehicle communication security is underway from the aspects of hardware and software. Software-based research includes AUTOSAR SecOC, TLS, DTLS, IPsec, MACsec, a VLAN, and the like. Representative hardware-based research includes an HSM, a TPM, and the like.

In the vehicle industry, the in-vehicle communication security field faces many challenges pertaining to cost, performance, and technology. Current research is focused mainly on combined use of the above-mentioned technologies, rather than on robustness of security. Therefore, in order to evaluate and improve the security level of the developed technology, it is necessary to propose components for in-vehicle network communication security and a method of operating the same.

Meanwhile, Korean Patent No. 10-1554634, titled "Apparatus and method for a vehicle external interface for protecting in-vehicle network" discloses an apparatus and method for a vehicle external interface capable of protecting an in-vehicle network by applying a unidirectional physical communication structure to a device that accesses a vehicle from outside the vehicle.

SUMMARY OF THE INVENTION

An object of the present invention is to provide components for in-vehicle communication security and a method of operating the same in an in-vehicle network.

Another object of the present invention is to meet requirements for technologies for authenticating a communication target, protecting communication messages, and managing encryption keys in an in-vehicle network.

In order to accomplish the above objects, an in-vehicle network apparatus according to an embodiment of the present invention may include one or more processors and executable memory for storing at least one program executed by the one or more processors. The at least one program may be configured to verify the integrity of software stored in advance in the executable memory, to generate a key table by sharing authentication information with a communication target, and to exchange an encrypted message with the communication target using the key table.

Here, the at least one program may be configured to generate the key table using authentication information, which includes the identifier of a software component of the in-vehicle network apparatus and the identifier of a software component of the communication target, and a secret key shared in advance with the communication target.

Here, the at least one program may be configured to decrypt encrypted authentication information of the communication target, which is received from the communication target, using the secret key, to encrypt authentication information of the in-vehicle network apparatus using a session key included in the decrypted authentication information of the communication target, and to reply to the communication target with the encrypted authentication information of the in-vehicle network apparatus.

Here, the at least one program may be configured to change the value of the session key by the size of the authentication information of the in-vehicle network apparatus, which is encrypted using the session key.

Here, the at least one program may be configured to decrypt encrypted authentication information of the communication target, which is received from the communication target, using the session key and to change the value of the session key by the size of the encrypted authentication information of the communication target.

Here, the at least one program may be configured to record the authentication information, the secret key, and the session key in the key table and to update the key table based on the changed value of the session key when the value of the session key is changed.

Here, the at least one program may be configured to exchange an encrypted message with the communication target using the updated key table.

Here, the at least one program may be configured to replace the secret key with a previously stored next secret key along with the communication target when it is confirmed that the ignition of a vehicle is turned off, to update the key table using the next secret key, to replace the session key with a new session key by exchanging an encrypted message with the communication target using the updated key table, and to update the key table using the new session key.

Also, in order to accomplish the above objects, an in-vehicle network method of an in-vehicle network apparatus according to an embodiment of the present invention may include verifying the integrity of software stored in advance in the in-vehicle network apparatus; generating a key table by sharing authentication information with a communication target; and exchanging an encrypted message with the communication target using the key table.

Here, generating the key table may be configured to generate the key table using authentication information, which includes the identifier of a software component of the in-vehicle network apparatus and the identifier of a software component of the communication target, and a secret key shared in advance with the communication target.

Here, exchanging the encrypted message may be configured to decrypt encrypted authentication information of the communication target, which is received from the communication target, using the secret key shared in advance with the communication target, to encrypt authentication information of the in-vehicle network apparatus using a session key included in the decrypted authentication information of the communication target, and to reply to the communication target with the encrypted authentication information of the in-vehicle network apparatus.

Here, exchanging the encrypted message may be configured to change the value of the session key by the size of the authentication information of the in-vehicle network apparatus, which is encrypted using the session key.

Here, exchanging the encrypted message may be configured to decrypt encrypted authentication information of the communication target, which is received from the communication target, using the session key and to change the value of the session key by the size of the encrypted authentication information of the communication target.

Here, exchanging the encrypted message may be configured to record the authentication information, the secret key, and the session key in the key table, and to update the key table based on the changed value of the session key when the value of the session key is changed.

Here, exchanging the encrypted message may be configured to exchange an encrypted message with the communication target using the updated key table.

Here, exchanging the encrypted message may be configured to replace the secret key with a previously stored next secret key along with the communication target when it is confirmed that the ignition of a vehicle is turned off, to update the key table using the next secret key, to replace the session key with a new session key by exchanging an encrypted message with the communication target using the updated key table, and to update the key table using the new session key.

BRIEF DESCRIPTION OF THE DRAWINGS

The above and other objects, features and advantages of the present invention will be more clearly understood from the following detailed description, taken in conjunction with the accompanying drawings, in which:

FIG. 3 is a view illustrating the process of message encryption and authentication processing performed by an in-vehicle network apparatus according to an embodiment of the present invention;

FIG. 4 is a view illustrating the identifier of a software component included in an in-vehicle network apparatus according to an embodiment of the present invention;

FIG. 5 is a view illustrating a key table according to an embodiment of the present invention;

DESCRIPTION OF THE PREFERRED EMBODIMENTS

Figure 1:
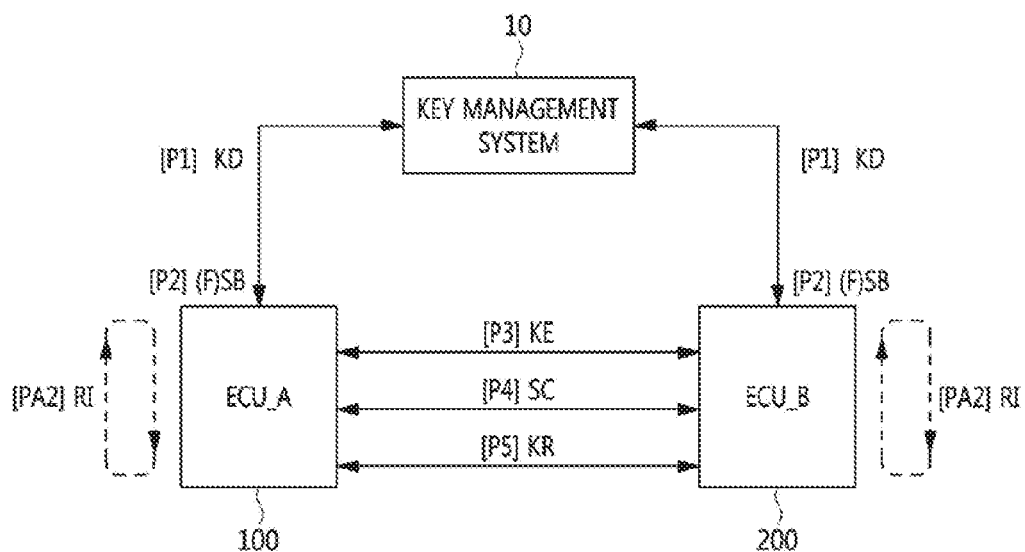
FIG. 1 is a block diagram illustrating an in-vehicle network apparatus according to an embodiment of the present invention.

The present invention will be described in detail below with reference to the accompanying drawings. Repeated descriptions and descriptions of known functions and configurations that have been deemed to unnecessarily obscure the gist of the present invention will be omitted below. The embodiments of the present invention are intended to fully describe the present invention to a person having ordinary knowledge in the art to which the present invention pertains. Accordingly, the shapes, sizes, etc. of components in the drawings may be exaggerated in order to make the description clearer.

Throughout this specification, the terms "comprises" and/or "comprising" and "includes" and/or "including" specify the presence of stated elements but do not preclude the presence or addition of one or more other elements unless otherwise specified. Also, the term "unit", "member", "module", or the like may be understood as a unit for processing at least one function or operation, and such a unit may be implemented as hardware, software, or a combination thereof.

Hereinafter, a preferred embodiment of the present invention will be described in detail with reference to the accompanying drawings.

Figure 2:
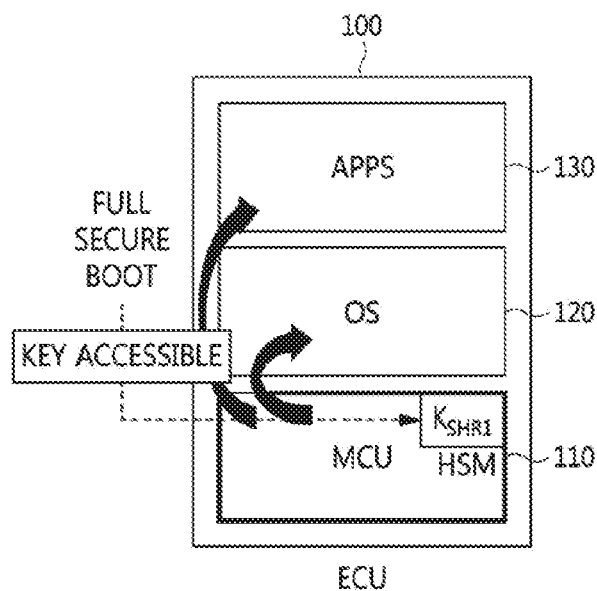
FIG. 2 is a view illustrating a secure boot process of an in-vehicle network apparatus according to an embodiment of the present invention.

FIG. 1 is a block diagram illustrating an in-vehicle network apparatus according to an embodiment of the present invention. FIG. 2 is a view illustrating a secure boot process of an in-vehicle network apparatus according to an embodiment of the present invention. FIG. 3 is a view illustrating the process of message encryption and authentication processing performed by an in-vehicle network apparatus according to an embodiment of the present invention. FIG. 4 is a view illustrating the identifier of a software component included in an in-vehicle network apparatus according to an embodiment of the present invention. FIG. 5 is a view illustrating a key table according to an embodiment of the present invention.

Referring to FIG. 1, an in-vehicle network system according to an embodiment of the present invention includes a key management system 10, a first in-vehicle network apparatus 100 (ECU_A), and a second in-vehicle network apparatus 200 (ECU_B).

The first in-vehicle network apparatus 100 according to an embodiment of the present invention may perform Phase 1: Key Distribution (P1 KD) along with the second in-vehicle network apparatus 200 through the key management system 10.

Also, the first in-vehicle network apparatus 100 and the second in-vehicle network apparatus 200 according to an embodiment of the present invention may perform Phase 2: Full Secure Boot (P2 FSB).

Also, the first in-vehicle network apparatus 100 and the second in-vehicle network apparatus 200 according to an embodiment of the present invention may perform Phase 3: Key Exchange (P3 KE).

Also, the first in-vehicle network apparatus 100 and the second in-vehicle network apparatus 200 according to an embodiment of the present invention may perform Phase 4: Secure Communication (P4 SC).

Also, the first in-vehicle network apparatus 100 and the second in-vehicle network apparatus 200 according to an embodiment of the present invention may perform Phase 5: Key Renewal (P5 KR).

Also, the first in-vehicle network apparatus 100 and the second in-vehicle network apparatus 200 according to an embodiment of the present invention may perform Phase After P2: Runtime Integrity checking (PA2 RI).

At the key distribution step (P1 KD), the IDentifier (ID) and the secret key of the second in-vehicle network apparatus 200, which is the target with which the first in-vehicle network apparatus intends to communicate, may be distributed to a Hardware Security Module (HSM) inside an Electronic Control Unit (ECU), which is the first in-vehicle network apparatus 100, through the key management system 10. This step is mainly performed by the Original Equipment Manufacturer (OEM) of a vehicle, and may be performed during the vehicle-manufacturing process or after manufacture of the vehicle is complete. This step is performed by following the protocol and procedure of the OEM.

At the full secure boot step (P2 FSB), secure booting for verifying the integrity of software in the ECU may be performed.

Referring to FIG. 2, components related to the full secure boot step (P2 FSB) and a simple operation thereof are illustrated.

As shown in FIG. 2, the ECU 100, which is an in-vehicle network apparatus, may include one or more Micro Controller Units (MCUs) 110, and may include an Operating System (OS) 120 and Applications (Apps) 130 through one or more executable memory devices. The MCU 110 operates as a central processing unit, and may include a Hardware Security Module (HSM) for a vehicle in order to support hardware-based security functions. The HSM may have the function of preventing key information from being leaked outside. The MCU 110 may verify the integrity of all kinds of software, including the OS 120 and the Apps 130, through the HSM.

Here, when integrity verification performed by the MCU 110 succeeds, the OS 120 and the Apps 130 may use the key information in the HSM.

For example, the secure boot methods according to an embodiment of the present invention may include a method in which the MCU/HSM autonomously verify the OS and the Apps and a method for verifying from a Root-Of-Trust module to the subsequent modules based on a chain of trust using the MCU/HSM.

At the key exchange step the encryption keys of the ECUs may be exchanged.

The ECU_A 100 and the ECU_B 200 may exchange keys for protecting communication messages, and may individually store the keys in the HSMs thereof.

At the secure communication step (P4 SC), secure communication between the ECUs may be performed.

Using a key that is changed so as to make it difficult for attackers to predict the same, the ECU_A 100 and the ECU_B 200 may encrypt and decrypt communication messages and process authentication in the HSMs.

Referring to FIG. 3, an example of the process of message encryption and authentication processing in the HSM is illustrated.

As shown in FIG. 3, a secret key may be shared in advance between the ECU_A and the ECU_B. The plaintext of the ECU_B may be encrypted, and ciphertext may be hashed in order to create a Message Authentication Code (MAC). The MAC and the ciphertext may be transmitted to the ECU_A. The ECU_A may hash the ciphertext and compare the hashed ciphertext with the MAC.

Here, when the hashed ciphertext is the same as the MAC, the ECU_A may determine that the integrity and the veracity of the plaintext are verified.

At the key renewal step (P5 KR), the key in each of the HSMs may be replaced.

At the runtime integrity-checking step (PA2 RI), the function of detecting whether software is tampered with during the ECU execution time may be performed. At the runtime integrity-checking step (PA2 RI), whether the software being executed in the memory is falsified is detected, and periodic memory-monitoring or a recent memory encryption method may be applied.

Referring to FIG. 4, examples of the identifiers of Software Components (SWCs) in an ECU are illustrated.

As shown in FIG. 4, communication between ECUs is actually communication between the SWCs in the respective ECUs. A single SWC has a unique identifier (ID), and the unique ID may be used in order to identify a transmitter and a receiver. In the present invention, when the SWC identified by ID_A1 and the SWC identified by ID_B1 communicate with each other, encryption and decryption of a communication message and authentication processing may be performed through an HSM_A and an HSM_B, as shown in FIG. 3. At the key distribution step (P1 KD), the communication IDs may be distributed to the HSMs along with a secret key based on the OEM protocol and policy.

Referring to FIG. 5, an example of a key table generated in the HSM after the key distribution step (P1 KD) is illustrated.

As shown in FIG. 5, a Local IDentifier (LID) indicates the ID of an SWC in the current ECU, and a Remote IDentifier (RID) indicates the ID of an SWC in a remote ECU that is allowed to communicate with the current ECU. A shared key ShrK is the secret key that is distributed along with the communication target IDs at the key distribution step (P1 KD). A session key SesK is the session key (encryption key) to be generated and exchanged for encryption/decryption of a communication message and authentication thereof.

Figure 6:
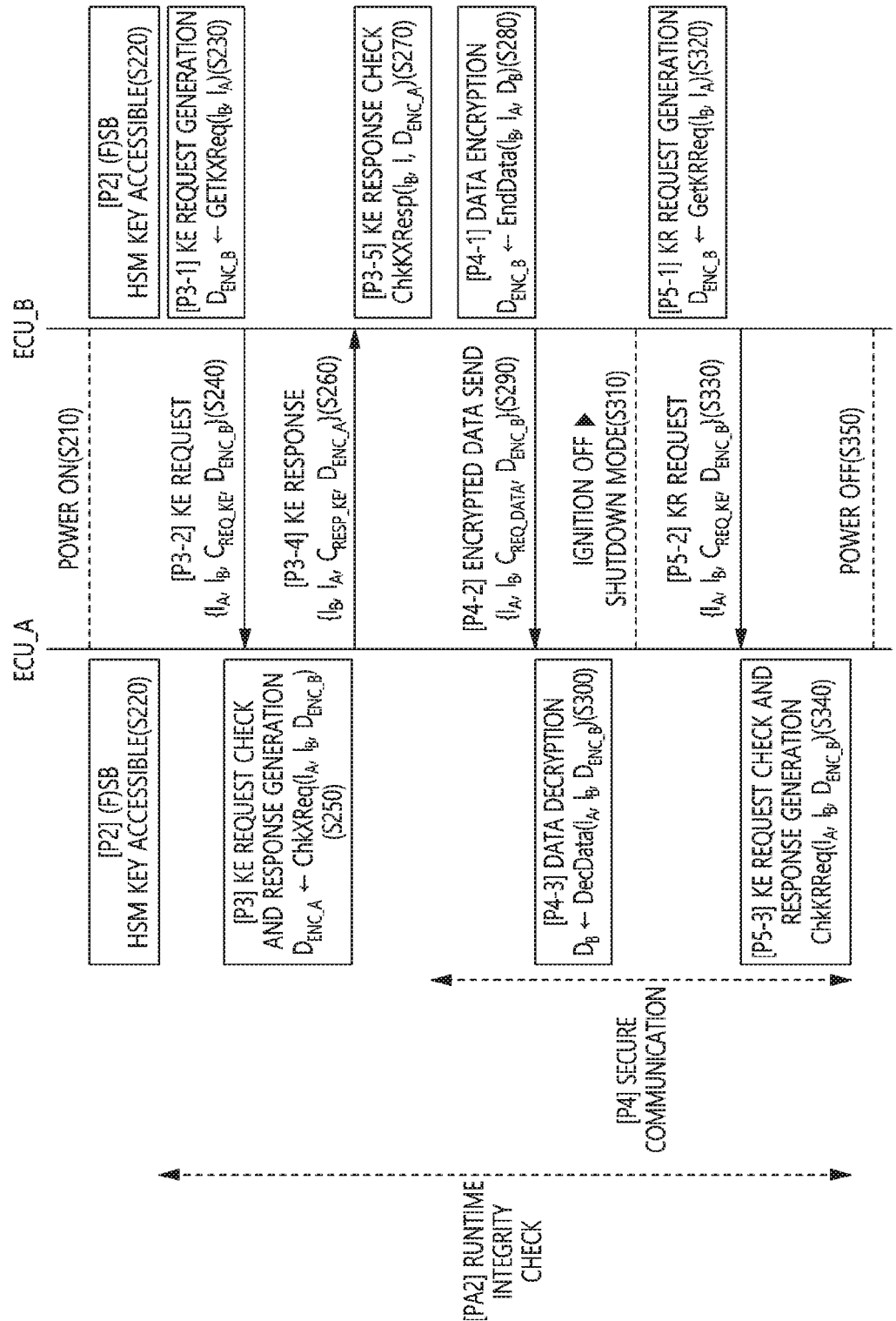
FIG. 6 is a sequence diagram illustrating an in-vehicle network method according to an embodiment of the present invention.

FIG. 6 is a sequence diagram illustrating an in-vehicle network method according to an embodiment of the present invention.

Referring to FIG. 6, the in-vehicle network method according to an embodiment of the present invention will be described using an example in which the ECU_A, which is a first in-vehicle network apparatus, is assumed to be a receiver, and the ECU_B, which is a second in-vehicle network apparatus, is assumed to be a transmitter. The in-vehicle network apparatus according to an embodiment of the present invention is able to operate as a receiver or a transmitter.

In the in-vehicle network method according to an embodiment of the present invention, first, when power is supplied (POWER ON), an operation may commence at step S210.

Here, before step S210 is performed, a secret key and a key table may be shared in advance between the ECU_A and the ECU_B.

Also, in the in-vehicle network method according to an embodiment of the present invention, secure booting may be performed at step S220.

That is, at step S220, the ECU_A and the ECU_B may verify the integrity of software (the OS and Apps) using the HSMs, and may use the key table when integrity verification succeeds.

Here, the key table in the HSM is not accessible from the outside, and encryption and decryption of a communication message and authentication processing thereof may be performed in the HSM.

Also, in the in-vehicle network method according to an embodiment of the present invention, the key table may be generated by sharing authentication information with a communication target, and an encrypted message may be exchanged with the communication target using the key table at steps S230 to S300.

First, at step S230, the ECU_B may generate a session key SesK, corresponding to the identifier (LID) $I_B$ of the software component thereof and the identifier (RID) $I_A$ of the software component of the communication target, and authentication information of the SWC_B.

Here, at step S230, the ECU_B may encrypt the session key SesK corresponding to the LID $I_B$ and the RID $I_A$, and the authentication information of the SWC_B using the shared secret key ShrK, thereby acquiring encrypted information $D_{ENC\_B}$.

Also, at step S240, the ECU_B may transmit a key exchange request message, which includes the receiver $I_A$, the transmitter $I_B$, a key exchange request $C_{REQ\_KE}$, and the encrypted information $D_{ENC\_B}$, to the ECU_A.

Also, at step S250, the encrypted information $D_{ENC\_B}$ may be decrypted using the shared secret key ShrK, the authentication information of the SWC_B may be verified, the session key SesK of the ECU_B may be stored in the HSM of the ECU_A, authentication information of the SWC_A may be generated, the authentication information may be encrypted using the session key SesK ($D_{ENC\_A}$), and the function of changing the value of the session key SesK by the size of the encrypted information $D_{ENC\_A}$ may be performed.

The function of changing the value of the session key SesK increases or decreases the value of the session key SesK, thereby enabling a communication message to always be encrypted using a new session key SesK.

Here, at step S250, the ECU_A may update the key table depending on the change in the value of the session key SesK.

Also, at step S260, the ECU_A may reply with a key exchange response message, which includes the receiver $I_B$, the transmitter $I_A$, a key exchange response $C_{RESP\_KE}$, and the encrypted information $D_{ENC\_A}$.

Also, at step S270, the ECU_B may decrypt the encrypted information $D_{ENC\_A}$ using the session key SesK, verify the authentication information of the SWC_A, and perform the function of changing the value of the session key SesK by the size of the encrypted information $D_{ENC\_A}$, whereby the session key SesK may be synchronized between the ECU_A and the ECU_B.

Here, at step S270, the ECU_B may update the key table depending on the change in the value of the session key SesK.

Also, at step S280, the ECU_B may perform encryption and authentication processing using the session key SesK in order to securely transmit data $D_B$.

Also, at step S290, the ECU_B may transmit the data $C_{REQ\_DATA}$, which is encrypted using the session key SesK.

Here, at step S300, the ECU_B may change the value of the session key SesK based on the size of the data encrypted using the session key SesK.

Here, at step S300, the ECU_B may update the key table depending on the change in the value of the session key SesK.

Also, at step S300, the ECU_A may decrypt the encrypted data using the session key SesK and verify the decrypted data.

Here, at step S300, the ECU_A may change the value of the session key SesK based on the size of the data encrypted using the session key SesK.

Here, at step S300, the ECU_A may update the key table depending on the change in the value of the session key SesK.

Also, at step S310, when it is confirmed that the ignition of the vehicle is turned off (Ignition OFF), the ECU_A and the ECU_B may replace the secret key ShrK shared therebetween.

Also, at step S320, the ECU_B replaces the secret key with the next secret key, which has been stored in advance, and may generate a key exchange request message encrypted using the new secret key, as performed at step S230.

Here, at step S320, the ECU may update the key table with the new session key value, which is changed based on the new secret key and the size of the encrypted key exchange request message.

Also, at step S330, the ECU_B may transmit the key exchange request message, encrypted using the new secret key, to the ECU_A, as performed at step S240.

Also, at step S340, the ECU_A may verify the key exchange request message, as performed at step S250, and may update the key table with the session key value that is changed based on the new secret key and the size of the encrypted key exchange request message.

Here, at step S340, the step of verifying based on the new secret key whether the key update has succeeded may be additionally performed, as performed at steps S260 and S270.

Also, at step S350, when it is confirmed that the power is turned off, the in-vehicle network method may be finished.

The ECU runtime integrity-checking function (PA2 RI) may be continuously performed until the power of the ECU is turned off after the secure boot (P2).

Figure 7:
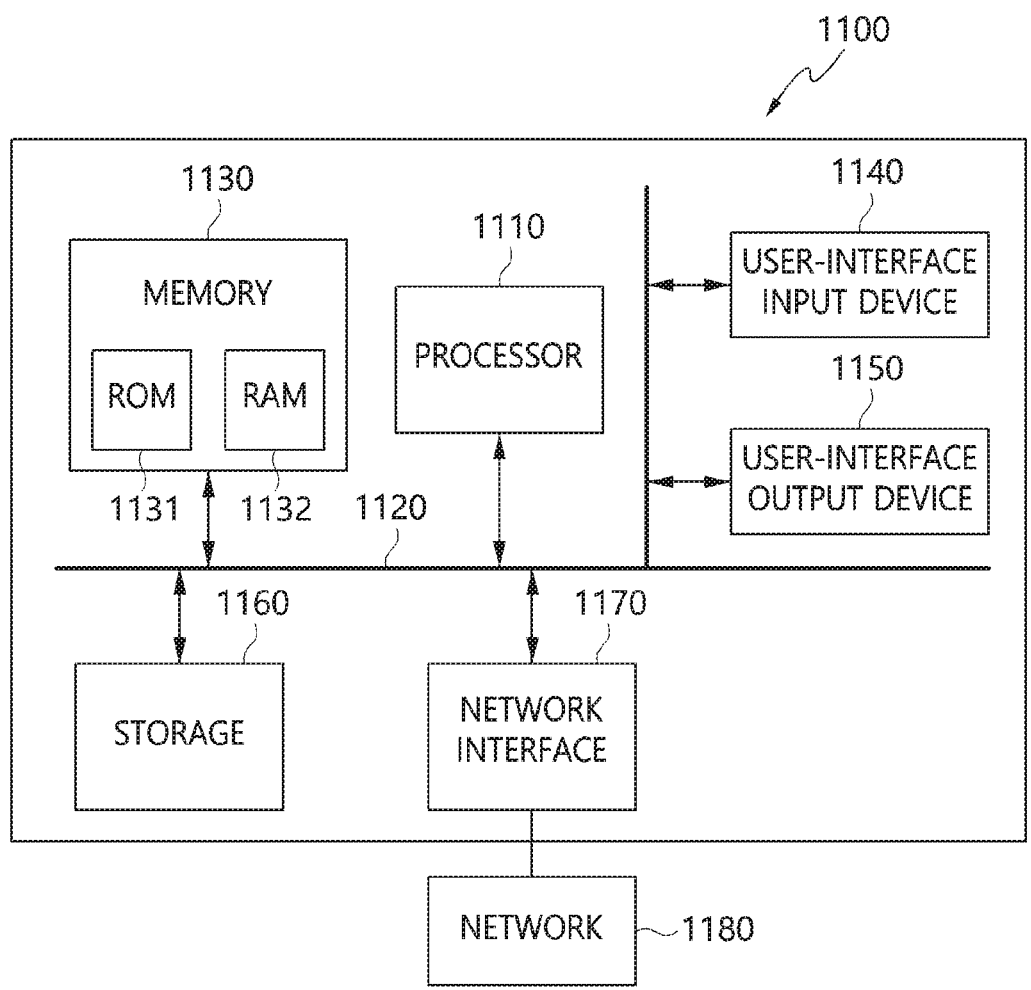
FIG. 7 is a view illustrating a computer system according to an embodiment of the present invention.

FIG. 7 is a view illustrating a computer system according to an embodiment of the present invention.

Referring to FIG. 7, the in-vehicle network apparatus 100 according to an embodiment of the present invention may be implemented in a computer system 1100 including a computer-readable recording medium. As illustrated in FIG. 7, the computer system 1100 may include one or more processors 1110, memory 1130, a user-interface input device 1140, a user-interface output device 1150, and storage 1160, which communicate with each other via a bus 1120. Also, the computer system 1100 may further include a network interface 1170 connected to a network 1170. The processor 1110 may be a central processing unit or a semiconductor device for executing processing instructions stored in the memory 1130 or the storage 1160. The memory 1130 and the storage 1160 may be any of various types of volatile or nonvolatile storage media. For example, the memory may include ROM 1131 or RAM 1132.

The in-vehicle network apparatus 100 according to an embodiment of the present invention may include one or more processors 1110 and executable memory 1130 for storing at least one program executed by the one or more processors 1110. The at least one program verifies the integrity of software stored in advance in the executable memory 1130, generates a key table by sharing authentication information with a communicate target, and exchanges an encrypted message with the communication target using the key table.

Here, the at least one program may generate the key table using authentication information, including the identifier of the software component of the in-vehicle network apparatus and the identifier of the software component of the communication target, and a secret key shared in advance with the communication target.

Here, the at least one program may decrypt encrypted authentication information of the communication target, which is received from the communication target, using the secret key, encrypt the authentication information of the in-vehicle network apparatus using a session key included in the decrypted authentication information of the communication target, and reply to the communication target with the encrypted authentication information of the in-vehicle network apparatus.

Here, the at least one program may change the value of the session key by the size of the authentication information of the in-vehicle network apparatus, which is encrypted using the session key.

Here, the at least one program may decrypt encrypted authentication information of the communication target, received from the communication target, using the session key, and may change the value of the session key by the size of the encrypted authentication information of the communication target.

Here, the at least one program may record the authentication information, the secret key, and the session key in the key table, and may update the key table based on the new value of the session key when the value of the session key is changed.

Here, the at least one program may exchange an encrypted message with the communication target using the updated key table.

Here, upon confirming that the ignition of a vehicle is turned off, the at least one program may replace the secret key with the next secret key, which has been stored in advance, along with the communication target, update the key table using the next secret key, replace the session key with a new session key by exchanging an encrypted message with the communication target using the updated key table, and update the key table using the new session key.

The present invention may provide components for in-vehicle communication security and a method of operating the same in an in-vehicle network.

The present invention may meet requirements for technologies for authenticating a communication target, protecting communication messages, and managing encryption keys in an in-vehicle network.

As described above, the in-vehicle network apparatus and method according to the present invention are not limitedly applied to the configurations and operations of the above-described embodiments, but all or some of the embodiments may be selectively combined and configured, so the embodiments may be modified in various ways.

What is claimed is:

1. An in-vehicle network apparatus, comprising:
one or more processors; and
executable memory for storing at least one program executed by the one or more processors,
wherein the at least one program is configured to verify integrity of software stored in advance in the executable memory, generate a key table by sharing authentication information with a communication target, and exchange an encrypted message with the communication target using the key table, and
wherein a runtime integrity-checking function is continuously performed until power of the in-vehicle network apparatus is turned off after a secure boot,
wherein the at least one program is configured to generate the key table using authentication information, which includes an identifier of a software component of the in-vehicle network apparatus and an identifier of a software component of the communication target, and a secret key shared in advance with the communication target,
wherein the at least one program is configured to decrypt encrypted authentication information of the communication target, which is received from the communication target, using the secret key, encrypt authentication information of the in-vehicle network apparatus using a session key included in the decrypted authentication information of the communication target, and reply to the communication target with the encrypted authentication information of the in-vehicle network apparatus,
wherein the at least one program is configured to change a value of the session key by a size of the authentication information of the in-vehicle network apparatus, which is encrypted using the session key.

2. The in-vehicle network apparatus of claim 1, wherein the at least one program is configured to decrypt encrypted authentication information of the communication target, which is received from the communication target, using the session key, and change the value of the session key by a size of the encrypted authentication information of the communication target.

3. The in-vehicle network apparatus of claim 2, wherein the at least one program is configured to record the authentication information, the secret key, and the session key in the key table, and update the key table based on a changed value of the session key when the value of the session key is changed.

4. The in-vehicle network apparatus of claim 3, wherein the at least one program is configured to exchange an encrypted message with the communication target using the updated key table.

5. The in-vehicle network apparatus of claim 4, wherein the at least one program is configured to: replace the secret key with a previously stored next secret key along with the communication target when it is confirmed that an ignition of a vehicle is turned off, update the key table using the next secret key, replace the session key with a new session key by exchanging an encrypted message with the communication target using the updated key table, and update the key table using the new session key.

6. An in-vehicle network method of an in-vehicle network apparatus, comprising:
verifying integrity of software stored in advance in the in-vehicle network apparatus;
generating a key table by sharing authentication information with a communication target; and
exchanging an encrypted message with the communication target using the key table,
wherein a runtime integrity-checking function is continuously performed until power of the in-vehicle network apparatus is turned off after a secure boot,
wherein generating the key table is configured to generate the key table using authentication information, which includes an identifier of a software component of the in-vehicle network apparatus and an identifier of a software component of the communication target, and a secret key shared in advance with the communication target, wherein exchanging the encrypted message is configured to:
decrypt encrypted authentication information of the communication target, which is received from the communication target, using the secret key shared in advance with the communication target,
encrypt authentication information of the in-vehicle network apparatus using a session key included in the decrypted authentication information of the communication target, and
reply to the communication target with the encrypted authentication information of the in-vehicle network apparatus,
wherein exchanging the encrypted message is configured to change a value of the session key by a size of the authentication information of the in-vehicle network apparatus, which is encrypted using the session key.

7. The in-vehicle network method of claim 6, wherein exchanging the encrypted message is configured to:
decrypt encrypted authentication information of the communication target, which is received from the communication target, using the session key, and
change the value of the session key by a size of the encrypted authentication information of the communication target.

8. The in-vehicle network method of claim 7, wherein exchanging the encrypted message is configured to:
record the authentication information, the secret key, and the session key in the key table, and
update the key table based on a changed value of the session key when the value of the session key is changed.

9. The in-vehicle network method of claim 8, wherein exchanging the encrypted message is configured to exchange an encrypted message with the communication target using the updated key table.

10. The in-vehicle network method of claim 9, wherein exchanging the encrypted message is configured to:
replace the secret key with a previously stored next secret key along with the communication target when it is confirmed that an ignition of a vehicle is turned off, update the key table using the next secret key,
replace the session key with a new session key by exchanging an encrypted message with the communication target using the updated key table, and
update the key table using the new session key.

* * * * *